O. H. ESCHHOLZ.
ARC WELDING SYSTEM.
APPLICATION FILED MAY 7, 1919.
1,329,233. Patented Jan. 27, 1920.
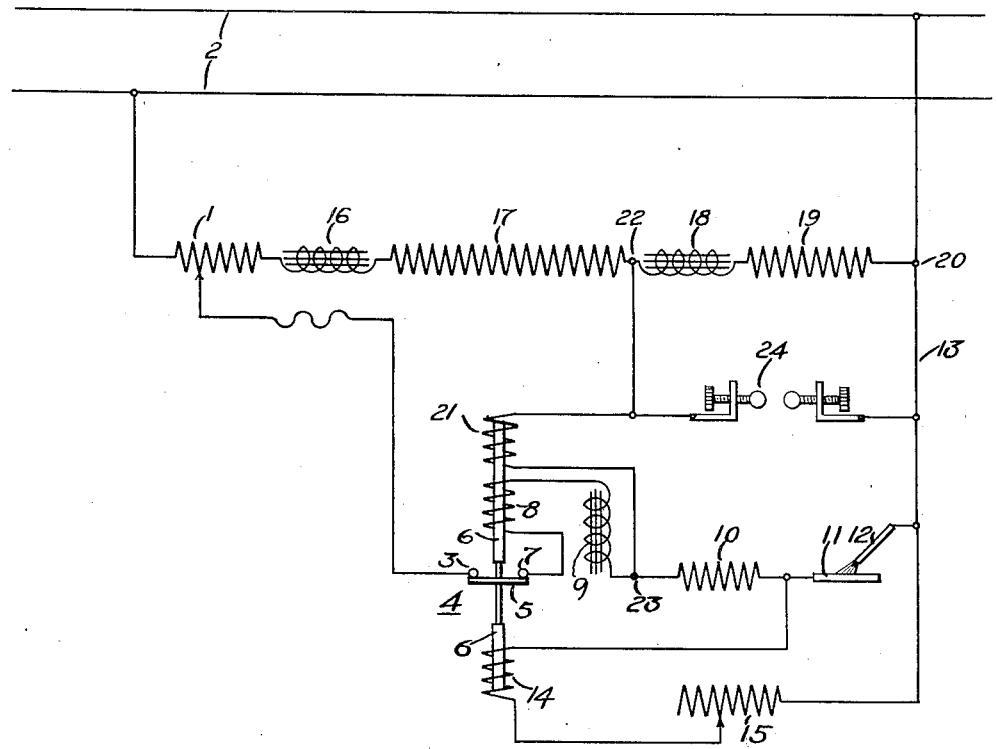
WITNESSES:
J. B. Merrill
O. E. Bee.
INVENTOR
Otto H. Eschholz
BY
Wesley G. Carr
ATTORNEY

UNITED STATES PATENT OFFICE.

OTTO H. ESCHHOLZ, OF WILKINSBURG, PENNSYLVANIA, ASSIGNOR TO WESTINGHOUSE ELECTRIC & MANUFACTURING COMPANY, A CORPORATION OF PENNSYLVANIA.

ARC-WELDING SYSTEM.

1,329,233.   Specification of Letters Patent.   Patented Jan. 27, 1920.

Application filed May 7, 1919. Serial No. 295,267.

*To all whom it may concern:*

Be it known that I, OTTO H. ESCHHOLZ, a citizen of the United States, and a resident of Wilkinsburg, in the county of Allegheny and State of Pennsylvania, have invented a new and useful Improvement in Arc-Welding Systems, of which the following is a specification.

My invention relates to arc welding systems and it has, for its primary object, the provision of a welding system which may be employed in relatively high-voltage circuits without danger to the operator.

It is common practice to employ supply circuits in welding where the voltage is a menace to the life of the operator, especially while the welding circuit is energized between interrupted operations. Under such conditions it is advisable to provide a means for automatically reducing the voltage to a safe value. One object of my invention resides, therefore, in providing a welding system which may be employed in welding with voltages, such, for example, as are employed in direct-current street-railway work, in which the voltage between electrodes or between the electrode and the work shall be automatically reduced to a safe value below that of the railway circuit.

Another object of my invention is to provide a welding system in which the arc voltage shall be automatically limited to a value which shall insure good weld characteristics, it being advantageous to employ a short arc in order to obtain a strong, homogeneous weld.

With these and other objects in view, my invention will be more fully understood by reference to the drawing. in the single figure of which, a welding system is diagrammatically shown which embodies my invention.

I may employ a welding system, such as is shown in the accompanying drawing as comprising a main welding circuit including a resistor 1 which may be connected to one side of a supply circuit 2 and may be connected, through a movable contact, to a contact 3 of a switch 4. The switch 4 may comprise a bridging member 5 which may be connected to a plurality of cores 6. The other contact 7 of the switch may be connected through a holding coil 8, disposed about one of the cores 6 and, through a suitable reactance 9 and a stabilizing resistance 10, to an electrode or piece of work 11. An electrode 12 may be connected to the other side of the supply circuit 2 by a lead 13, thus completing the main welding circuit. A switch-actuating coil 14, disposed about one of the cores 6 of the switch 4, may be connected, in parallel relation to the electrodes 11 and 12, through a variable resistor 15. The coil 14, being connected in this manner, is consequently energized under operating conditions or all the time an arc is in operation. A reactance 16 and a resistor 17 may be connected in series with the resistor 1 and may be connected in series with another reactance 18 and a resistor 19, which may be connected to a lead 13, as indicated at 20.

A starting circuit for the welding system may be provided by connecting one end of a switch-actuating coil 21, disposed about one of the cores 6 of the switch 4, between the resistor 17 and the reactance 18, as indicated at 22, and its other end may be connected in the main welding circuit, as indicated at 23. It will be apparent from the connection of the coil 21, that, when the electrodes 11 and 12 are separated or in open circuit, the voltage between the electrodes will be limited to the drop in voltage across the reactance 18 and the resistor 19, which voltage may be regulated to any desired safe value. If it seems desirable, a protective gap 24 of any suitable design may be provided to insure against danger of excessive voltage across the electrodes if, for any reason, the resistor 19 should become disconnected or the resistor 17 should become short circuited.

In operating the welding system above described, the switch 4 remains normally open, and welding operations may be started by engaging the electrode 12 and the work or electrode 11, thereby energizing the actuating coil 21 to operate the switch 4 to close the main welding circuit by bridging the contacts 3 and 7. The closing of the switch 4 causes the current from the supply circuit 2 to be shunted around the reactances 16 and 18 and the resistors 17 and 19 and to be conducted through the holding coil 8, the reactance 9 and the stabilizing resistance 10 to the work 11 and thus to the other side of the line. The movable contact member of the resistor 1 may be adjusted to regulate the amount of current drawn through the main welding system. When the switch 4 has been closed and the current has started to traverse the main welding circuit, the electrodes may be slowly separated to draw an arc, and the welding operation may be performed.

It is obvious that the coil 14 is energized by the arc voltage and tends to open the switch 4 against the holding force of the coil 8 and such action will take place when the arc voltage has reached sufficient value to cause the force exerted by the coil 14 to overcome that of the coil 8. The voltage at which the coil 14 shall exert sufficient force to overcome the action of the coil 8 may be adjusted to any desired value by regulating the value of the resistance offered by the resistor 15. Both the resistor 10 and the reactance coil 9 act as stabilizing means for the arc but, in some instances, the reactance 9 may be dispensed with without reducing the efficiency of the welding circuit. The resistor 10, however, is usually desirable in maintaining sufficiently stable conditions in the welding circuit to obtain good results.

As pointed out above, the resistor 19 is employed to reduce the voltage between the electrodes on open circuit and this resistance may be of any desired value to insure safe open-circuit conditions. The reactance 18, however, is employed as a stabilizing means for the arc under welding conditions. Since the reactance 18 is connected in parallel relation to the electrodes at all times, it tends to choke or retard any oscillations of current in the parallel circuit under welding conditions. The reactances 16 and 9 are also employed as a stabilizing means but they do not constitute an important part of the system and may readily be dispensed with without affecting the efficiency of the system.

It will be apparent from the above description that I have provided a simple and effective welding system which may be employed under common operating conditions, particularly where voltages dangerous to the life of the operator may be experienced. Although I have specifically described a welding system embodying my invention, I do not wish to be restricted to the minor details of assembly or association of the various resistors and reactances therein except as pointed out in the appended claims.

I claim as my invention:

1. In an electric-arc welding system, the combination with a supply circuit, of means for reducing the supply voltage to a comparatively low value between the welding electrodes on open circuit, and means for limiting the welding current when an arc is drawn between electrodes.

2. In an electric-arc welding system, the combination with a supply circuit, of means for reducing the supply voltage to a comparatively low value between the welding electrodes on open circuit, means for limiting the welding current when an arc is drawn between electrodes, and means for limiting the arc voltage to a predetermined value.

3. In an electric-arc welding system, the combination with a source of electric current, of a plurality of electrodes and a resistor connected in parallel relation to said source, a switch connected to shunt current around said resistor and conduct current to the electrodes under operating conditions, and a coil for actuating said switch and connected to be energized when the electrodes are engaged.

4. In an electric-arc welding system, a main welding circuit comprising a source of electric current, a variable impedance, a switch and a plurality of electrodes, a starting circuit including an impedance connected in parallel relation to the source of current, a coil in the starting circuit between the corresponding impedance and an electrode and connected to actuate the switch to close the main welding circuit when the electrodes are brought into engagement.

5. In an electric-arc welding system, a main welding circuit comprising a source of electric current, a variable impedance, a switch, a holding coil therefor energized under operating conditions, and a plurality of electrodes, a starting circuit including an impedance connected in parallel relation to the source of current, a coil in the starting circuit between the corresponding impedance and an electrode and connected to actuate the switch to close the main welding circuit when the electrodes are brought into engagement.

6. In an electric-arc welding system, a main welding circuit comprising a source of electric current, a variable impedance, a switch, a holding coil therefor energized under operating conditions, a plurality of electrodes and a coil connected in parallel relation to the electrodes and operative when energized to open the switch, a starting circuit including an impedance connected in parallel relation to the source of current, a coil in the starting circuit between the corresponding impedance and an electrode and connected to actuate the switch to close the main welding circuit when the electrodes are brought into engagement.

7. In an arc-welding system, the combination with a main welding circuit including a work-piece and a coöperating movable electrode, of a normally open switch in circuit with said work-piece, an initial closing coil for said switch connected in series relation with the work-piece and electrode, a holding coil for the switch connected in said main welding circuit, and an opening coil for said switch having its terminals connected to the work-piece and to the electrode, respectively.

8. In an arc-welding system, the combination with a main welding circuit including a work-piece and a coöperating movable electrode, of a normally open switch in circuit with said work-piece, a variable impedance in said circuit, an initial closing coil for said switch connected in series relation with the work-piece and electrode, a holding coil for the switch connected in said main welding circuit, and an opening coil for said switch having its terminals connected to the work-piece and to the electrode, respectively.

9. An electric-arc welding system comprising means for connecting the system to a suitable supply circuit, means for reducing the supply voltage to a comparatively low value between the welding electrodes under open circuit conditions, and means for limiting the welding current when an arc is established between the electrodes.

In testimony whereof, I have hereunto subscribed my name this 23d day of April 1919.

OTTO H. ESCHHOLZ.